United States Patent
Wu et al.

(10) Patent No.: US 12,000,630 B2
(45) Date of Patent: Jun. 4, 2024

(54) COMPACT MEMBRANE-BASED ABSORPTION HEAT PUMP

(71) Applicant: City University of Hong Kong, Hong Kong (HK)

(72) Inventors: Wei Wu, Hong Kong (HK); Chong Zhai, Hong Kong (HK); Zengguang Sui, Hong Kong (HK); Yunren Sui, Hong Kong (HK); Zhixiong Ding, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 1 day.

(21) Appl. No.: 17/412,287

(22) Filed: Aug. 26, 2021

(65) Prior Publication Data

US 2023/0069597 A1  Mar. 2, 2023

(51) Int. Cl.
*F25B 37/00* (2006.01)
*F25B 15/02* (2006.01)

(52) U.S. Cl.
CPC .............. *F25B 37/00* (2013.01); *F25B 15/02* (2013.01)

(58) Field of Classification Search
CPC .......... F25B 15/00; F25B 15/02; F25B 15/06; F25B 37/00; F24F 2013/1493; F24F 2003/1435; F28F 3/027
See application file for complete search history.

(56) References Cited

U.S. PATENT DOCUMENTS

| | | | |
|---|---|---|---|
| 2010/0170776 A1* | 7/2010 | Ehrenberg | B01D 63/085 202/168 |
| 2014/0020419 A1* | 1/2014 | Carruthers | B01J 20/3078 62/235.1 |
| 2017/0284707 A1* | 10/2017 | Brenner | F25B 15/06 |

FOREIGN PATENT DOCUMENTS

JP    2019135436    *  8/2019 .............. F25B 15/00

OTHER PUBLICATIONS

Maria Venegas et al, Performance of a Solar Absorption Cooling System Using Nanofluids and a Membrane-Based Microchannel Desorber, Apr. 16, 2020 (Year: 2020).*

(Continued)

*Primary Examiner* — Frantz F Jules
*Assistant Examiner* — Webeshet Mengesha
(74) *Attorney, Agent, or Firm* — Idea Intellectual Limited; Margaret A. Burke; Sam T. Yip

(57) ABSTRACT

The present invention provides a heat pump that includes an absorber/evaporator module having a solution channel and a refrigerant channel along with first and second liquid channels. A porous membrane is positioned between the refrigerant channel and the solution channel; the porous membrane permits flow of vapor molecules therethrough while restricting flow of absorbent molecules. A membrane-based generator/condenser module with a similar structure is in fluid communication with the absorber/evaporator module. The membrane-based modules offer a large specific surface area with integrated solution/refrigerant flows, which (Continued)

enables formation of a highly compact heat pump exhibiting strong heat/mass transfer.

11 Claims, 14 Drawing Sheets

(56) References Cited

OTHER PUBLICATIONS

Zengguang Sui et al., "Swirling flow for performance improvement of a microchannel membrane-based absorber with discrete inclined grooves", International Journal of Refrigeration, 2021.

Zengguang Sui et al., "Performance investigation and enhancement of membrane-contactor microchannel absorber towards compact absorption cooling", International Journal of Heat and Mass Transfer, Jan. 10, 2021.

* cited by examiner

COMPACT MEMBRANE-BASED ABSORPTION HEAT PUMP

FIELD OF THE INVENTION

The present invention relates generally to the field of heat pumps. More particularly, the invention relates to devices, systems, subsystems, components and methods using a membrane-based generator/condenser module and a membrane-based absorber/evaporator module in a heat pump.

BACKGROUND

Technology advancement for heating, ventilating, and air-conditioning (HVAC) equipment is a critical part of mitigating global warming and creating a sustainable future. Energy consumption is the major source of greenhouse gases (GHGs) related to HVAC. The other significant source of GHGs from conventional HVAC equipment is leakage of the high global-warming-potential (GWP) hydrofluorocarbon (HFC) refrigerants. Therefore, both energy efficiency improvement and low-GWP refrigerant development are essential for combating global warming. Absorption heat pumps are a promising solution to significantly reduce both sources of GHGs. Absorption heat pumps can utilize renewable/waste energy, instead of fossil fuels or electrical powers, for cooling, heating, dehumidification, and energy storage. Additionally, absorption heat pumps usually use environmentally friendly working fluids (e.g., $H_2O$/LiBr, $NH_3/H_2O$) with very low GWP values, in line with the Kigali Amendment to the Montreal Protocol. However, the large size and thus high cost is a major problem preventing the use of absorption heat pumps in wider applications.

Heat pumps are energy technologies that can transfer heat from a low-temperature level to a high-temperature level. Such technologies can be used for refrigeration/cooling applications as well as heating applications. The heat transfer from low temperature to high temperature requires a thermodynamic input in the form of either work or heat. A typical representative of a work-driven heat pump is a vapor-compression heat pump, while a typical representative of a heat-driven heat pump is an absorption heat pump (liquid sorption) and an adsorption heat pump (solid sorption). The absorption heat pump outperforms the adsorption heat pump due to its higher energy efficiency.

Compared to the electrically driven vapor-compression heat pump, the thermally driven absorption heat pump can reduce the dependence on electricity by utilizing low-grade heat obtained from waste and renewable sources (e.g., solar, geothermal). However, for existing absorption heat pump systems, there are several major issues to be addressed for wider applications: improving the heat pump compactness to reduce the space requirement, enhancing the energy efficiency to reduce energy consumption, and lowering the driving temperature to utilize low-grade thermal energy that otherwise is unusable. Therefore, there is a growing need to develop compact and efficient absorption heat pumps with minimized space requirements and improved cost-effectiveness.

SUMMARY OF THE INVENTION

The present invention presents a novel absorption heat pump using a membrane-based generator/condenser module and a membrane-based absorber/evaporator module; it is a major advancement towards small-size, high-efficiency, and low-cost cooling/heating driven by thermal energy. The microchannel membrane-based modules offer a large specific surface area and integrate solution/refrigerant flows, which allows for high compactness and strong heat/mass transfer. In some embodiments, direct diffusion of water molecules through the membrane makes it possible to lower the required driving temperatures. The proposed invention can facilitate compact, efficient, and affordable low-carbon HVAC technologies.

In one embodiment, the present invention provides a heat pump that includes an absorber/evaporator module having a solution channel and a refrigerant channel along with first and second liquid channels. A porous membrane is positioned between the refrigerant channel and the solution channel; the porous membrane permits flow of vapor molecules therethrough while restricting flow of absorbent molecules. A membrane-based generator/condenser module with a similar structure is in fluid communication with the absorber/evaporator module. The microchannel membrane-based modules use membranes having a large specific surface area and integrated solution/refrigerant flows, which enables formation of a highly compact heat pump exhibiting strong heat/mass transfer.

DETAILED DESCRIPTION

In one aspect, the present invention may use a reversible physical/chemical process in which a gas is exothermically absorbed and endothermically desorbed on an absorbent medium (which may be a liquid or solid). For example, an absorption/desorption between a gas such as water vapor ($H_2O$), ammonia ($NH_3$) vapor, alcohol hydrofluorocarbon (HFC), hydrofluoroolefin (HFO), or $CO_2$ and a reagent such as salt, water, ionic liquid, or other absorbents. The desorption and absorption processes occur simultaneously in the generator/condenser module and the absorber/evaporator module, respectively, to provide continuous cooling or heating effects. The desorption and absorption processes are represented by the equation below (diluted solution means a lower fraction of absorbent; concentrated solution means a higher fraction of absorbent):

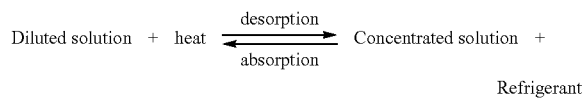

$H_2O$-based solutions (e.g., $H_2O/LiBr$, $H_2O/LiCl$) and $NH_3$-based solutions (e.g., $NH_3/H_2O$, $NH_3/LiNO_3$) are widely used absorption working fluids. The absorption heat pump mechanism of $H_2O$-based solutions can be represented by the equation below:

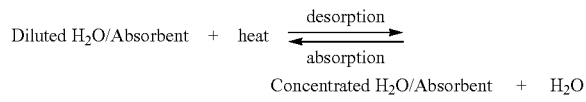

The absorption heat pump mechanism of $NH_3$-based solutions can be represented by the equation below:

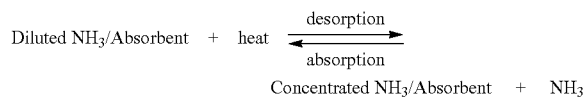

Figure 1:
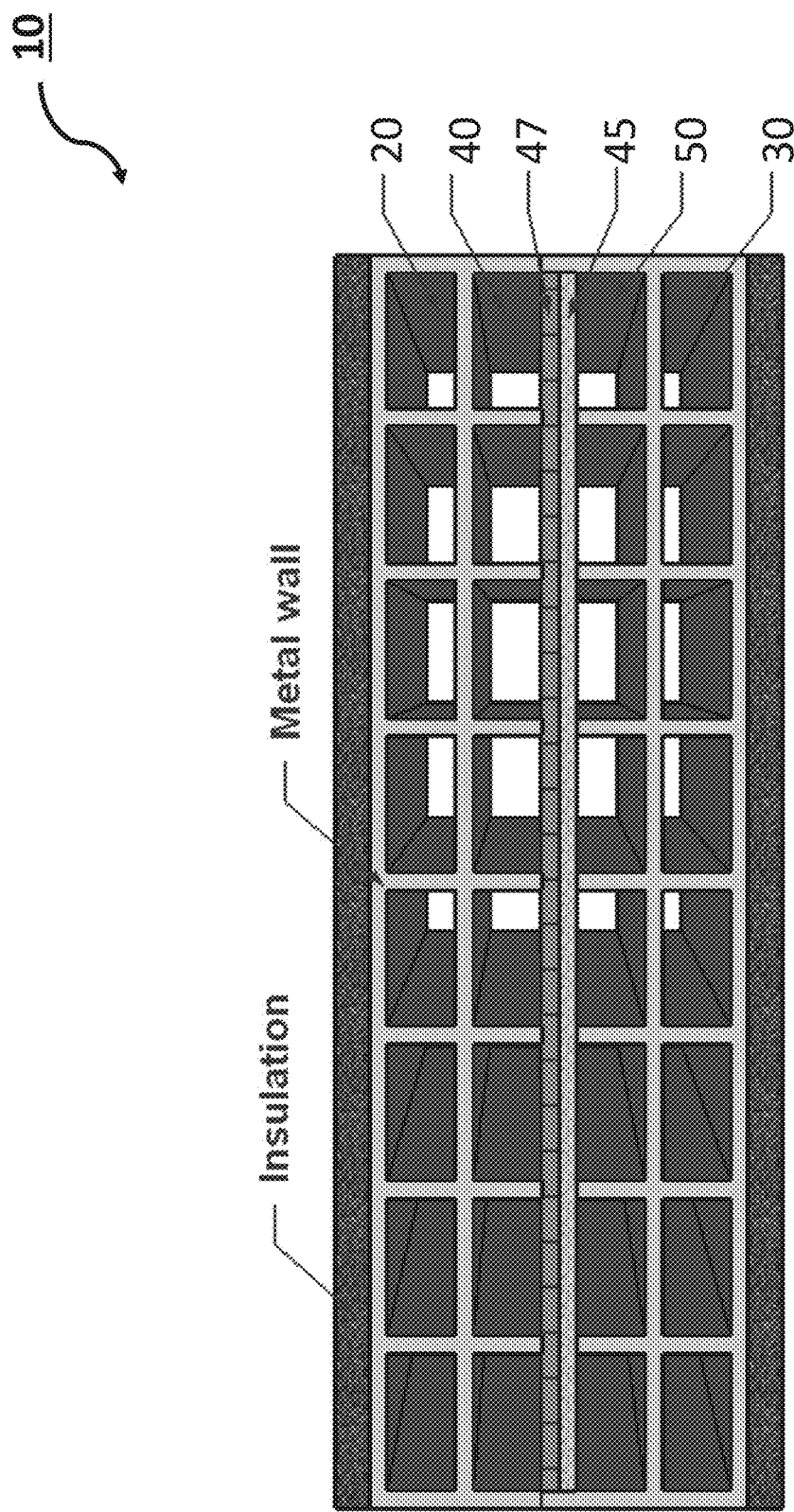
FIG. 1 depicts a membrane-based solution/refrigerant module according to an embodiment.

FIG. 1 depicts a membrane-based module 10 for use in a heat pump according to one embodiment of the present invention. The module 10 includes plural channels for solution (refrigerant/absorbent mixture), refrigerant, and heat source/sink liquids. The heat source/sink liquids, which may be hot water, conduction oil, cooling water, chilled water, antifreeze, etc. depending on the role of the fluid in different operation modes, flow through liquid channel 20 and liquid channel 30, respectively. The refrigerant channel 40 is positioned adjacent to the solution channel 50 and is separated by a porous membrane 45 and optional hollow membrane support plate 47. Note that the depiction of the module 10 is schematic only; the cross-sections of the various channels may be arbitrarily selected to be square, rectangular, circular, curved, and other selected shapes.

The porous membrane 45 used in the membrane-based module 10 is a porous membrane that acts as a semi-barrier, allowing small-sized molecules (e.g., vaporized refrigerant) to pass through the membrane, while restricting larger-sized molecules, (e.g., absorbent molecules) from passing through the membrane. Owing to the large specific surface area (interfacial area per unit volume) of the membrane, the membrane-based module provides a high-performance absorption/desorption process in a small volume, which is beneficial to the performance of a heat pump incorporating the module. Furthermore, the microchannels having a high specific surface area can be integrated with the membrane to obtain a highly-compact and highly-efficient absorption heat pump. Examples of porous membrane materials include polyethylene (PE), polypropylene (PP), polytetrafluoroethylene (PTFE), polyvinylidene fluoride (PVDF), or their composites, and other porous materials. The porous membrane may have a pore diameter in a range from approximately 0.2 to 6 microns with a thickness in a range from approximately 20 to approximately 175 microns and a porosity of approximately 0.4 to 0.85.

Figure 2:
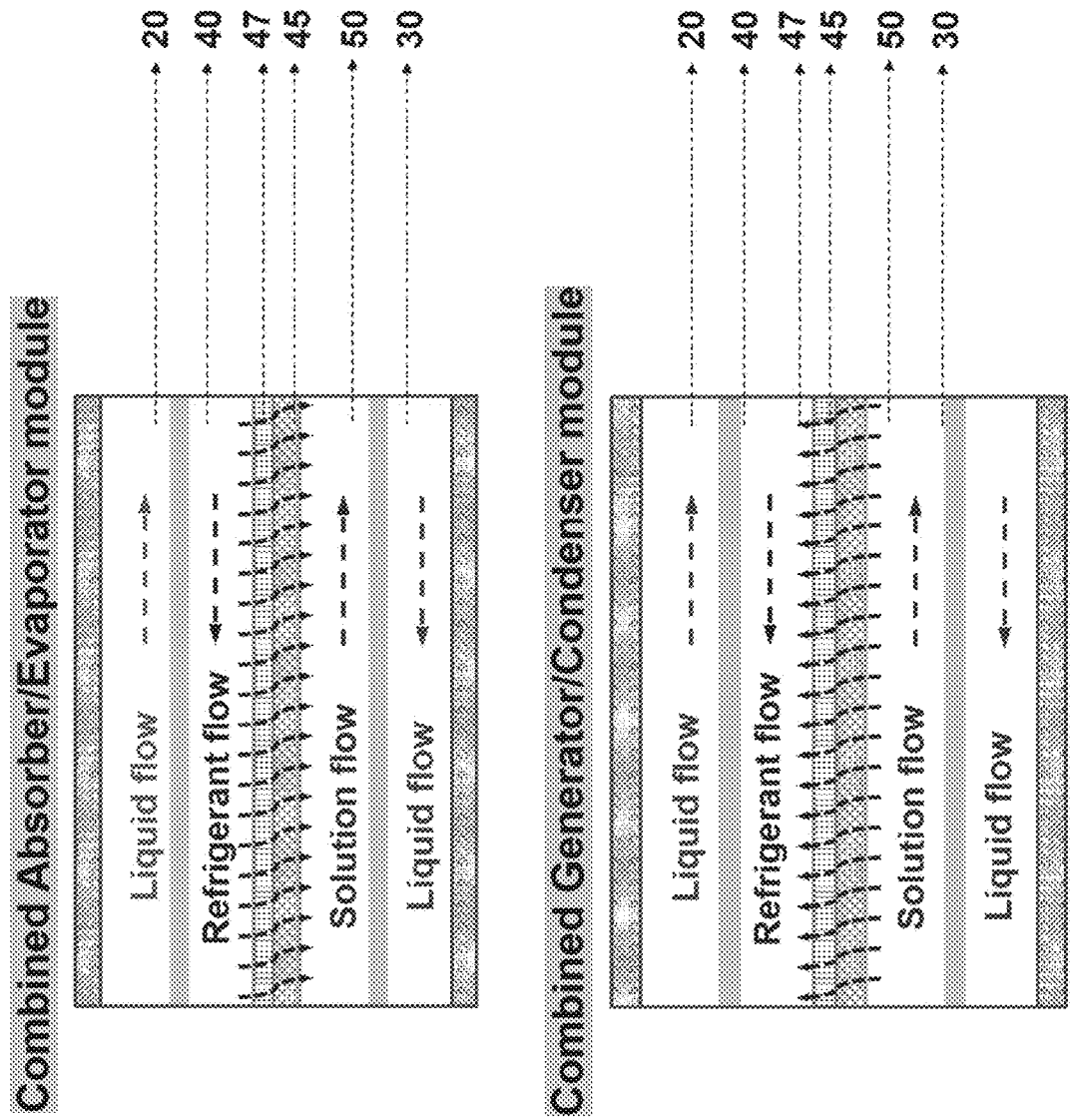
FIG. 2 depicts a membrane-based solution/refrigerant module of FIG. 1 used as a combined absorber/evaporator and combined generator/condenser.

FIG. 2 depicts the use of the module of FIG. 1 in a combined absorption/evaporation process in a combined absorber/evaporator and a combined generation/condensation process in a combined generator/condenser. In this manner, the connection tube between the absorber and evaporator and the connection tube between the generator and condenser can be eliminated, reducing pressure drops and increasing the compactness of the system.

Figure 3:
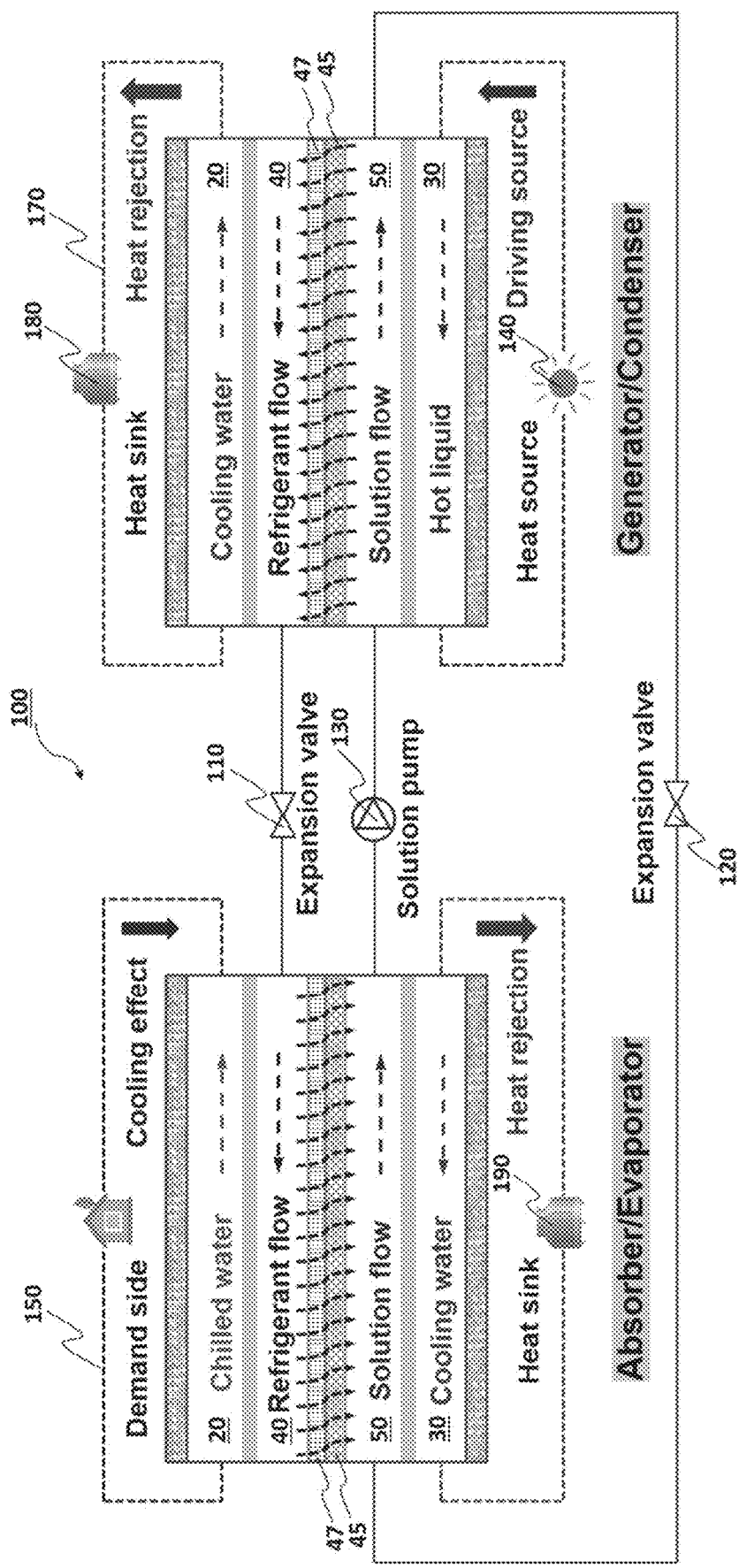
FIG. 3 depicts a cooling mode of a membrane-based absorption heat pump using the module of FIG. 1.

Based on the combined membrane-based modules, a membrane-based absorption heat pump 100 is provided as depicted in FIG. 3 which shows a cooling mode of the heat pump. A diluted solution is pumped from the solution channel 50 in the combined absorber/evaporator 150 into the solution channel 50 of the combined generator/condenser 170 by the solution pump 130. In the combined generator/condenser 170, thermally driven by hot liquid produced from heat source 140 (e.g., solar energy or waste energy), the diluted solution generates vaporized refrigerant whilst flowing inside the solution channel 50. The vaporized refrigerant passes through the porous membrane 45 and enters the refrigerant channel 40. Cooled by the cooling water produced from heat sink 180 (e.g., cooling tower or evaporative cooler), the vaporized refrigerant is condensed into liquid refrigerant in the refrigerant channel 40. The diluted solution becomes concentrated after the vapor generation process and flows back to the solution channel 50 of the combined absorber/evaporator 150. A solution pump 130 may be used to pump the solution.

With its selectivity characteristic, the porous membrane separates the feed solution into a retentate (concentrated solution) and a permeate (refrigerant) by controlling the movement of molecules across the membrane. Vaporized refrigerant is separated from the solution due to the vapor refrigerant pressure difference even at low driving temperatures. Thus, the desorption (generation) process occurs before the solution is heated to the boiling point, making it possible to apply low-grade energy (e.g., waste energy that ordinarily cannot be used) in the membrane-based absorption heat pump 100.

The liquid refrigerant from the refrigerant channel 40 of the combined generator/condenser 170 gets throttled in the expansion valve 110 and then flows into the refrigerant channel 40 of the combined absorber/evaporator 150. In the combined absorber/evaporator 150, cooled by the cooling water produced from heat sink 190, the saturated partial vapor pressure decreases inside the solution channel 50. Extracting low-grade heat from the chilled water in liquid channel 20, the liquid refrigerant evaporates and becomes vaporized refrigerant, which then passes through the porous membrane 45 and gets absorbed by the concentrated solution in the solution channel 50. The concentrated solution becomes diluted after the vapor absorption process and flows back to the solution channel 50 of the combined generator/condenser 170. The cooling capacity is produced via the evaporation effect in liquid channel 20 of the combined absorber/evaporator 150.

The membrane pores are filled with vaporized refrigerant evaporated from the refrigerant channel 40 while the solution is constrained inside the narrow flow channel 50 by the membrane 45 with its selective permeation property. The feed solution flows inside the solution channel 50, and the vaporized refrigerant is driven to the feed solution for absorption by the partial vapor pressure difference. Apart from enhanced heat/mass transfer of the inventive design, this membrane-based geometry design also makes the heat pump more resistant to mechanical shock and less sensitive to orientation.

Figure 4:
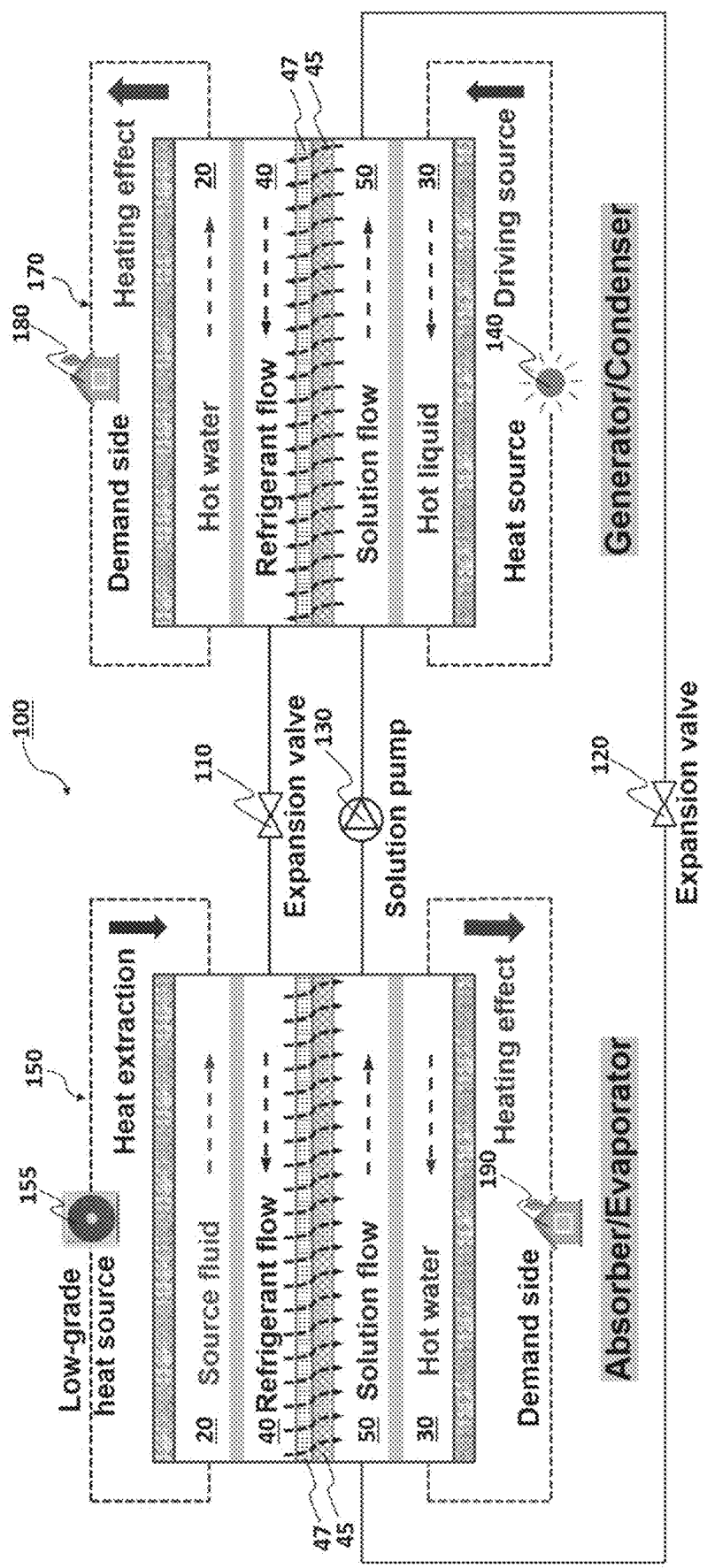
FIG. 4 depicts a heating mode of a membrane-based absorption heat pump using the module of FIG. 1.

The heating mode of the novel heat pump system is shown in FIG. 4. The heat/mass transfer process is similar to that of the cooling mode, but the evaporation process extracts low-grade heat generated by source 155 and transferred to the source fluid in liquid channel 20 of the combined absorber/evaporator 150. The heating capacity is produced via the absorption effect in liquid channel 30 of the combined absorber/evaporator 150 and the condensation effect in liquid channel 20 of the combined generator/condenser 170.

Note that all the figures only show one module of the combined absorber/evaporator and the combined generator/condenser, more modules can be combined in series or in parallel to enlarge the cooling/heating capacity.

Figure 5:
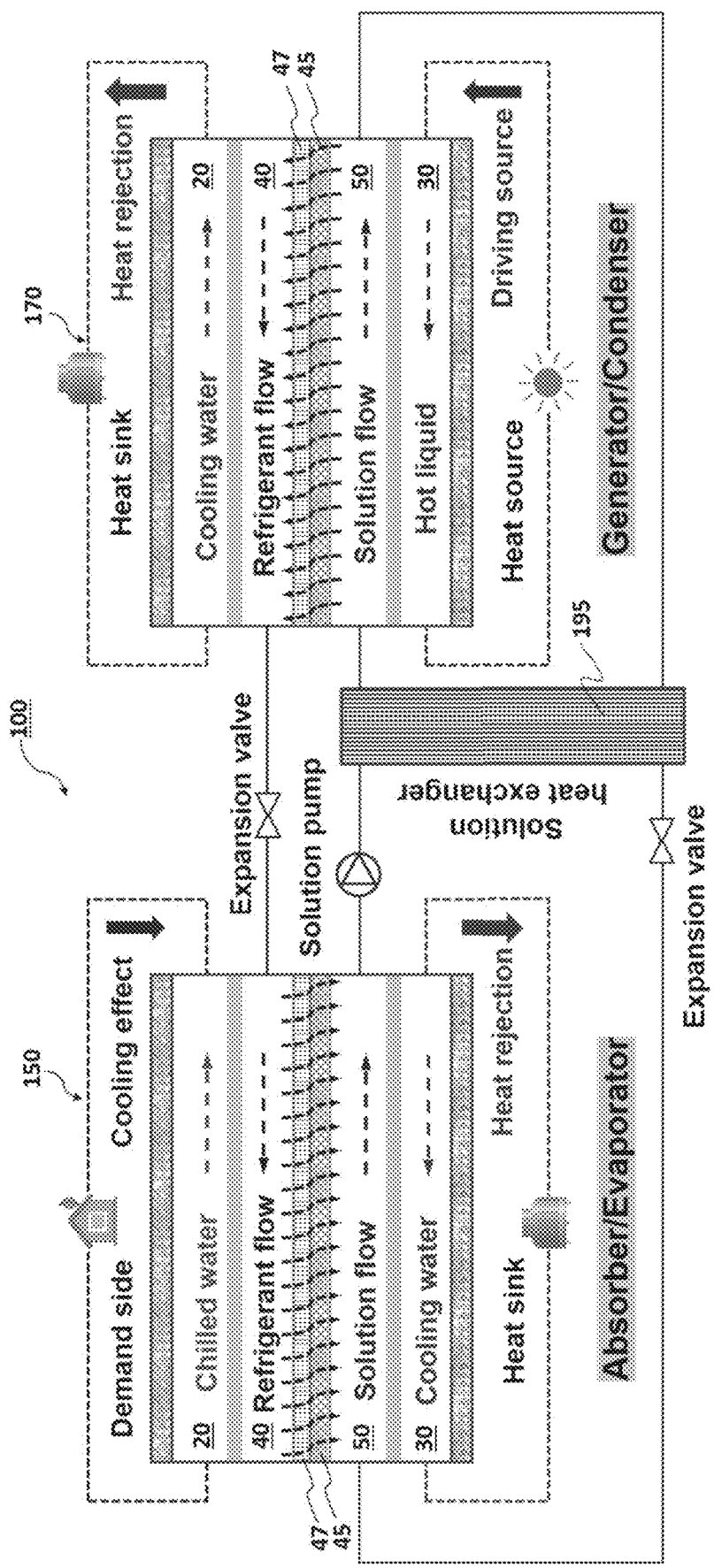
FIG. 5 depicts a cooling mode of a membrane-based absorption heat pump with a solution heat exchanger
Figure 6:
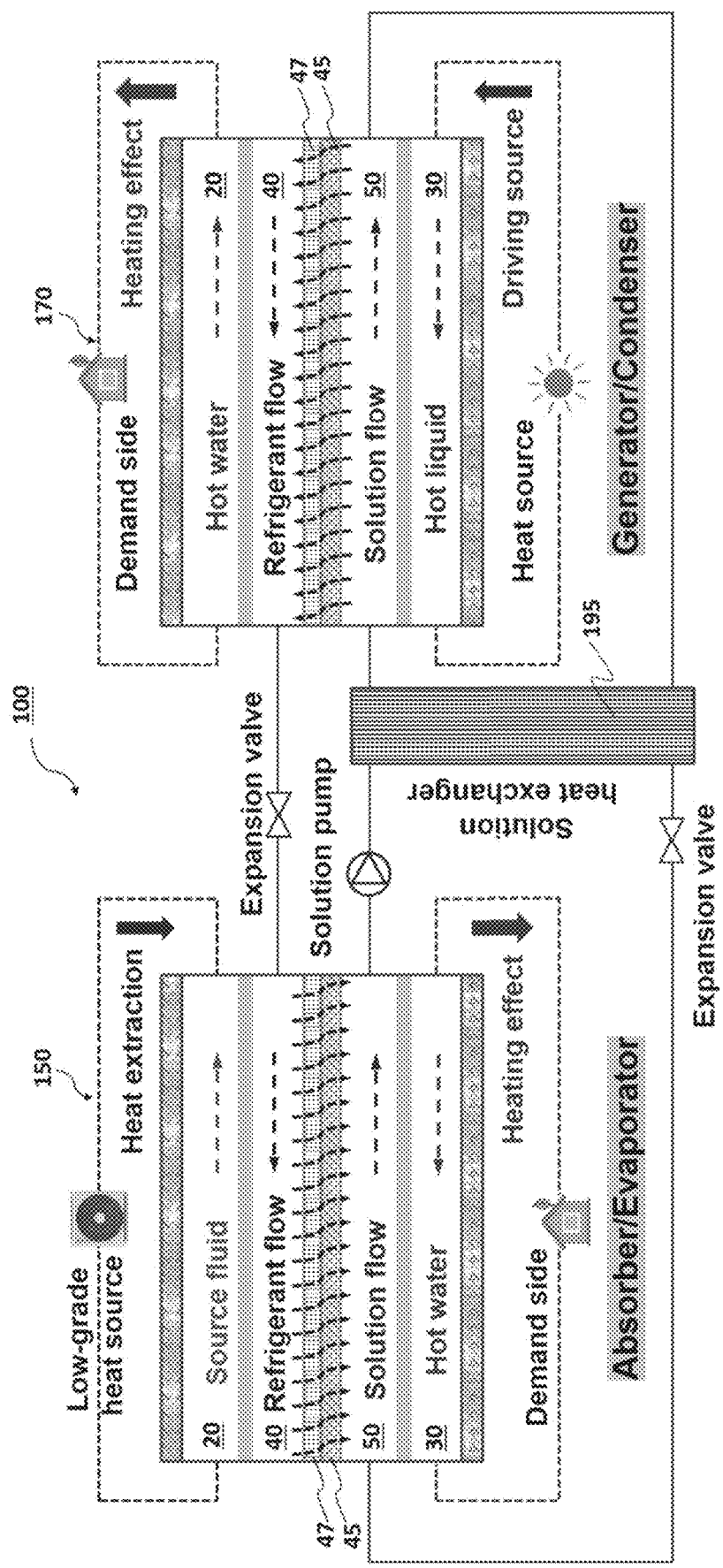
FIG. 6 depicts a heating mode of a membrane-based absorption heat pump with a solution heat exchanger

A solution heat exchanger 195 may be integrated between the combined absorber/evaporator and the combined generator/condenser for internal heat recovery as shown in FIGS. 5 and 6. The heat exchanger 195 can pre-heat the solution entering the combined generator/condenser 170 and pre-cool the solution entering the combined absorber/evaporator 150. In this manner, the efficiency of the membrane-based absorption heat pump can be further increased. The cooling mode and heating mode of the modified system are respectively shown in FIG. 5 and FIG. 6.

The solution (refrigerant/absorbent mixture) of the absorption heat pump can be various, including $H_2O$-based solutions, $NH_3$-based solutions, alcohol-based solutions, hydrofluorocarbon (HFC)-based solutions, hydrofluoroolefin (HFO)-based solutions, $CO_2$-based solutions, and other solutions. In these solutions, the absorbent can be salt, hydroxide, water, ionic liquid, or other inorganic/organic absorbents. In addition, the refrigerant can be pure refrigerant or blend refrigerant, and the absorbent can be pure absorbent or blend absorbent.

Figure 7:
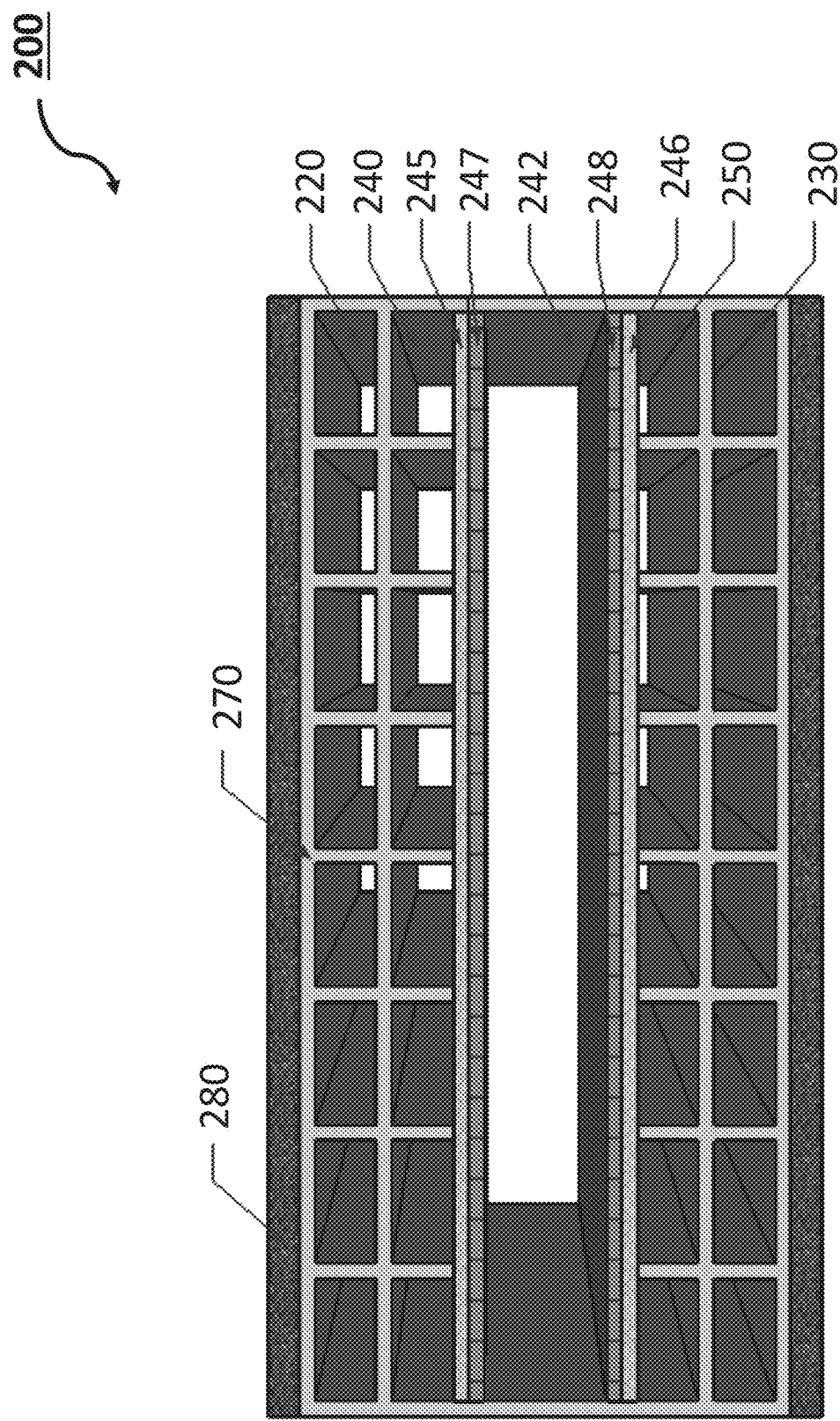
FIG. 7 depicts a membrane-based solution/refrigerant module with vapor channel according to an embodiment.

Another embodiment of a membrane-based module is shown in FIG. 7. The FIG. 7 module 200 includes at least five channels, a solution channel 250, a refrigerant channel 240, two liquid channels 220 and 230, and a vapor channel 242. The additional vapor channel 242 can eliminate heat conduction between the solution channel 250 and the refrigerant channel 240, avoiding heat interference with each other. Accordingly, two layers of porous membrane 245, 246 and two layers of hollow support plate 247, 248 are used.

Figure 8:
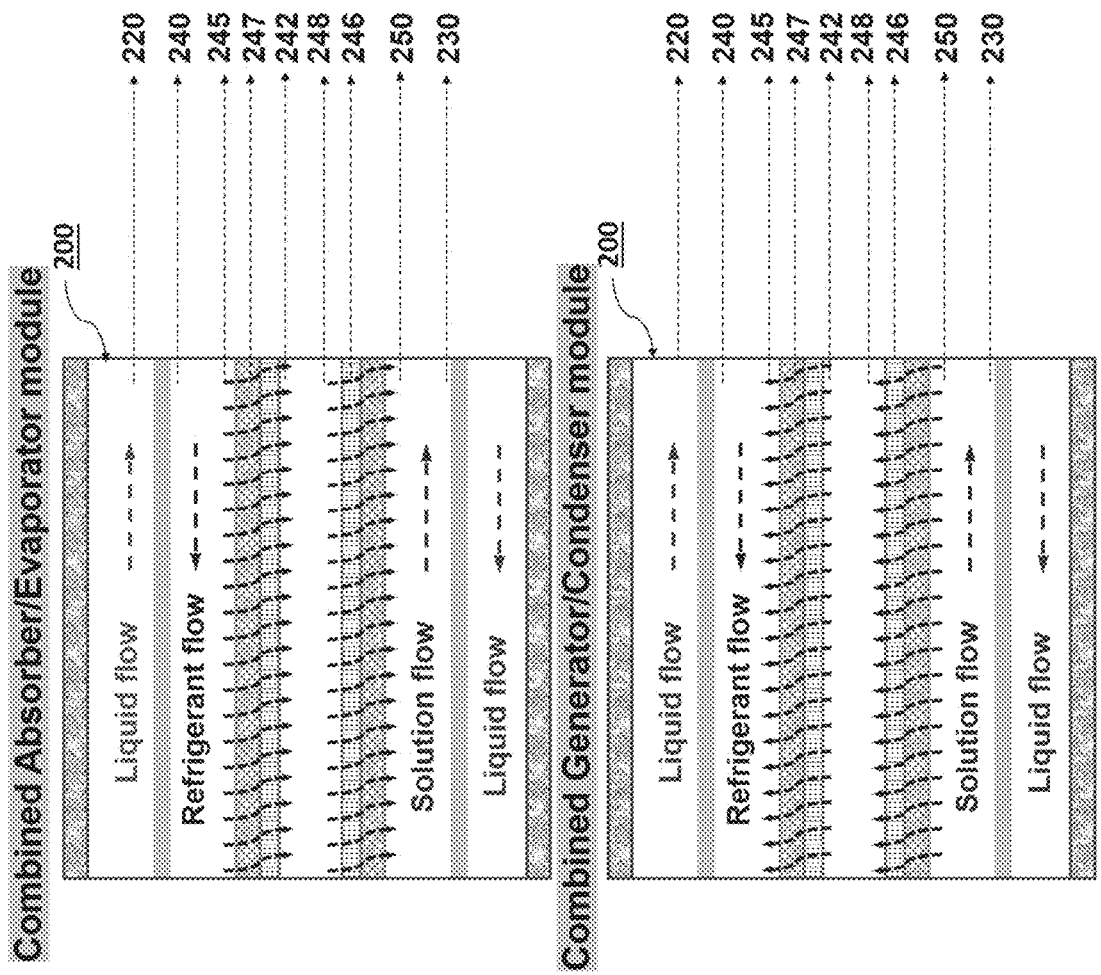
FIG. 8 depicts the membrane-based solution/refrigerant module of FIG. 7 used as combined absorber/evaporator and combined generator/condenser (with vapor channel)

Two modules 200 are used to create a combined absorber/evaporator and a combined generator/condenser with a vapor channel as shown in FIG. 8.

Figure 9:
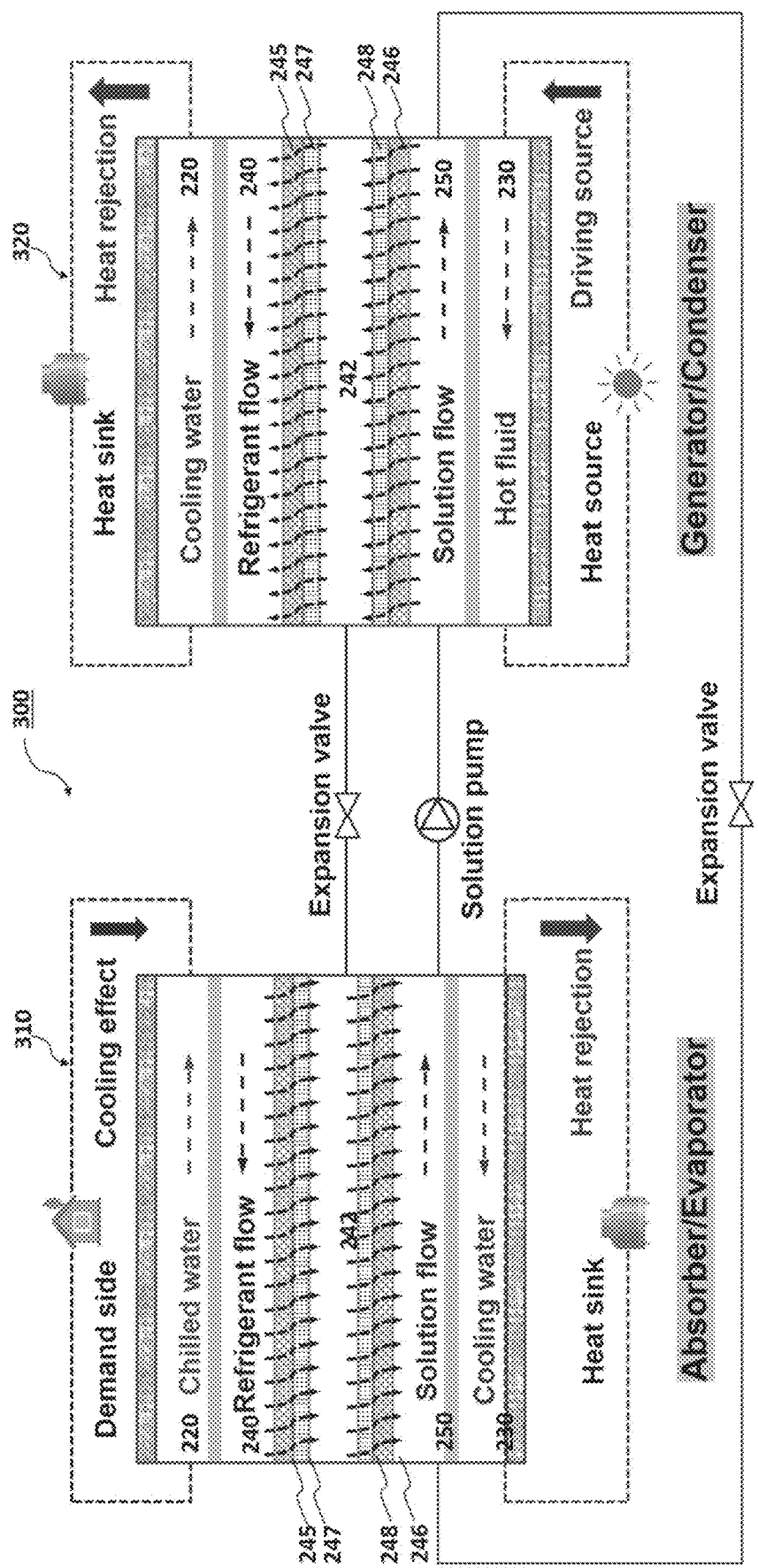
FIG. 9 depicts a cooling mode of a membrane-based absorption heat pump (with vapor channel) using the module of FIG. 7.
Figure 10:
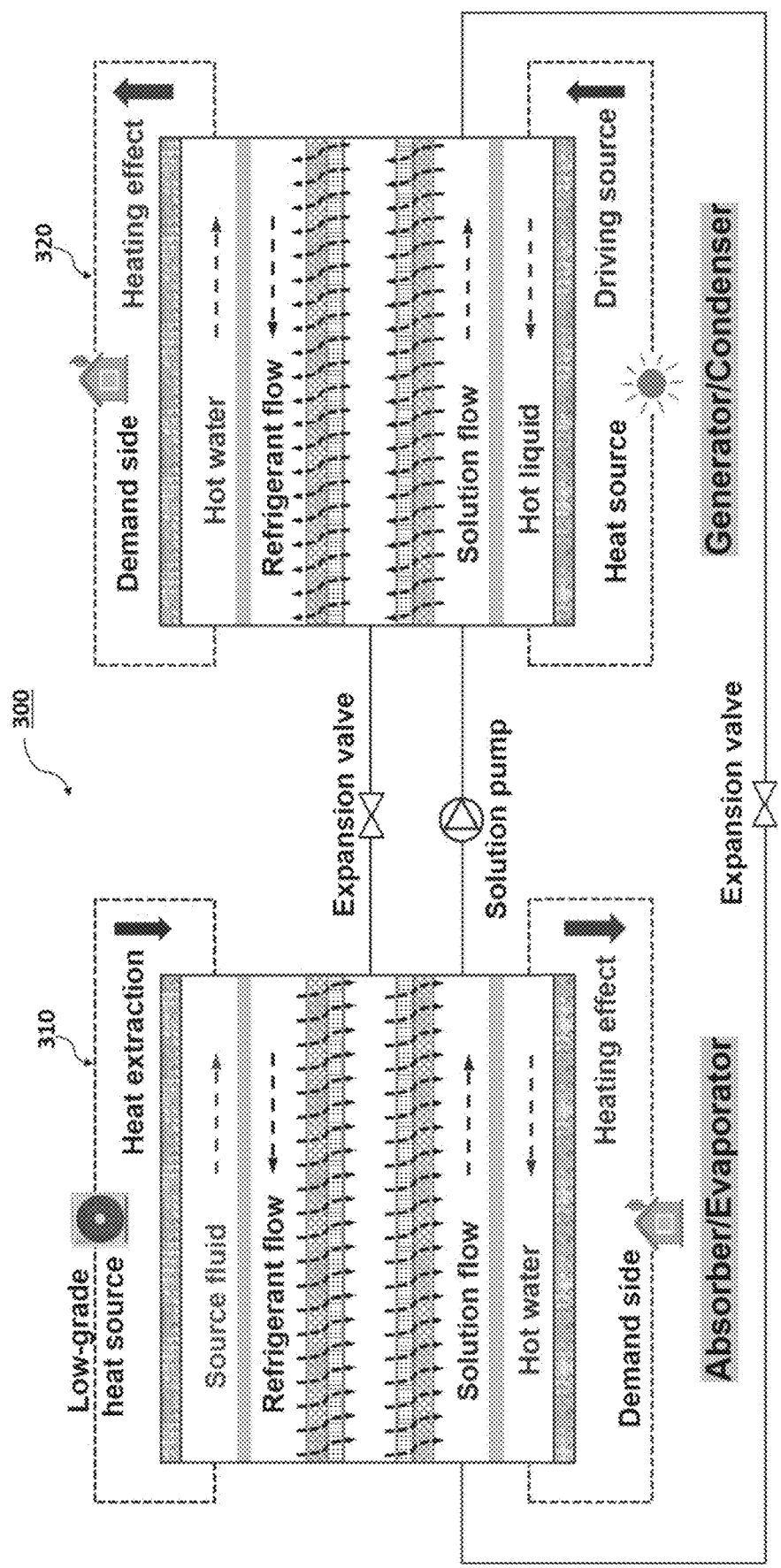
FIG. 10 depicts a heating mode of a membrane-based absorption heat pump (with vapor channel) using the module of FIG. 7.

Based on the membrane-based combined solution/refrigerant modules with a vapor channel, a modified membrane-based absorption heat pump 300 is provided as seen in FIGS. 9, 10. The cooling mode and heating mode of the modified system are shown respectively in FIG. 9 and FIG. 10. The operation processes are similar to those of FIGS. 3 and 4, with the differences as follows:

(1) In the combined absorber/evaporator 310, the vaporized refrigerant evaporated from the refrigerant channel 240 first passes through membrane 245 to enter the vapor channel 242, and then passes through membrane 246 to enter the solution channel 250, and finally gets absorbed in the solution channel 250.

(2) In the combined generator/condenser 320, the vaporized refrigerant generated from the solution channel 250 first passes through membrane 246 to enter the vapor channel 242, and then passes through membrane 245 to enter the refrigerant channel 240, and finally gets condensed in the refrigerant channel 240.

Figure 11:
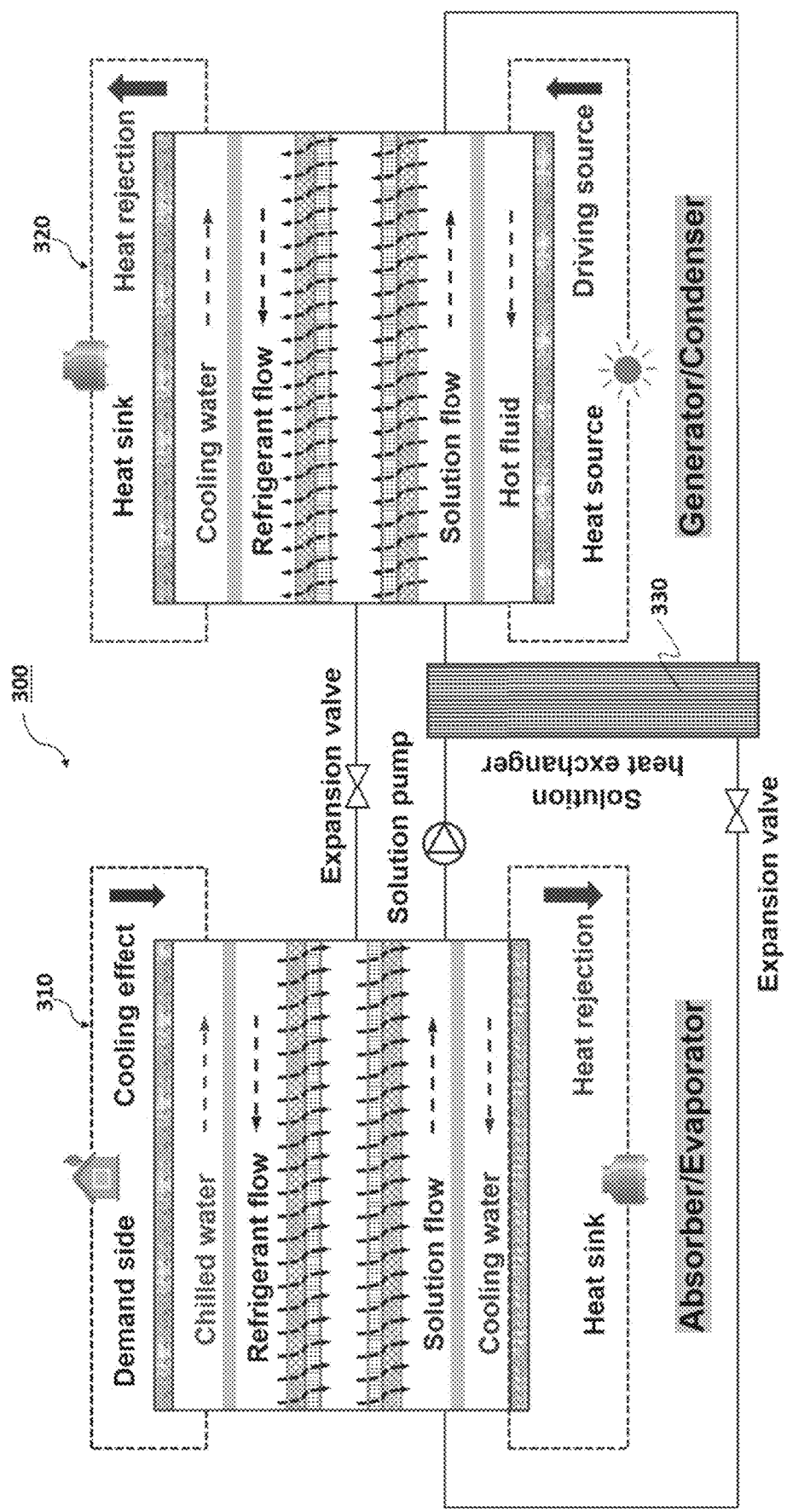
FIG. 11 depicts a cooling mode of the membrane-based absorption heat pump with a solution heat exchanger (with vapor channel)
Figure 12:
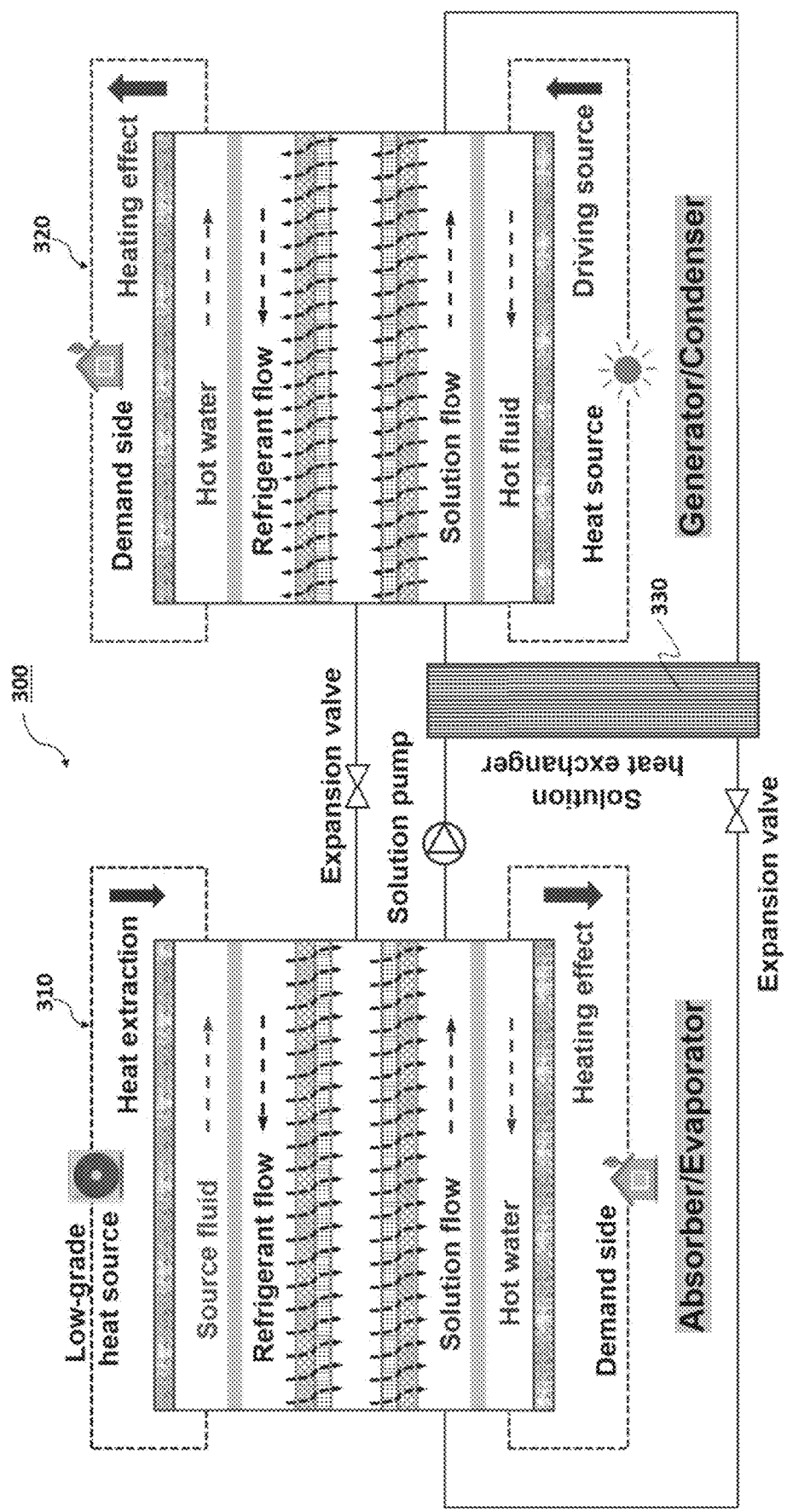
FIG. 12 depicts a heating mode of the membrane-based absorption heat pump with a solution heat exchanger (with vapor channel)

A solution heat exchanger 330 (FIGS. 11, 12) can be integrated between the combined absorber/evaporator 310 and the combined generator/condenser 320 for internal heat recovery. It can pre-heat the solution entering the combined generator/condenser 320 and pre-cool the solution entering between the combined absorber/evaporator 310. In this manner, the efficiency of the membrane-based absorption heat pump 300 can be further increased. The cooling mode and heating mode of the modified system are respectively shown in FIG. 11 and FIG. 12.

Figure 13:
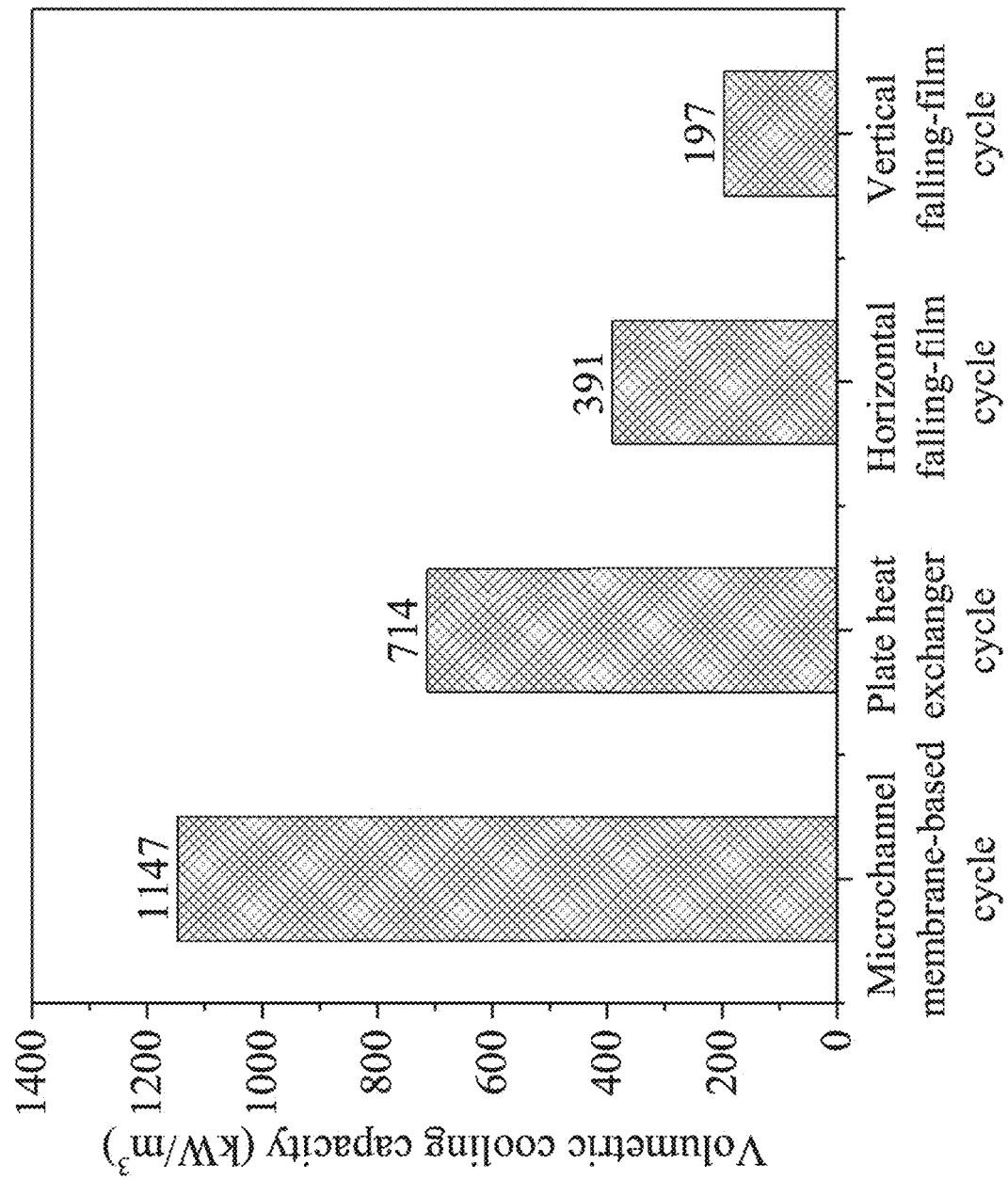
FIG. 13 depicts a comparison of compactness among different kinds of absorption heat pumps.
Figure 14:
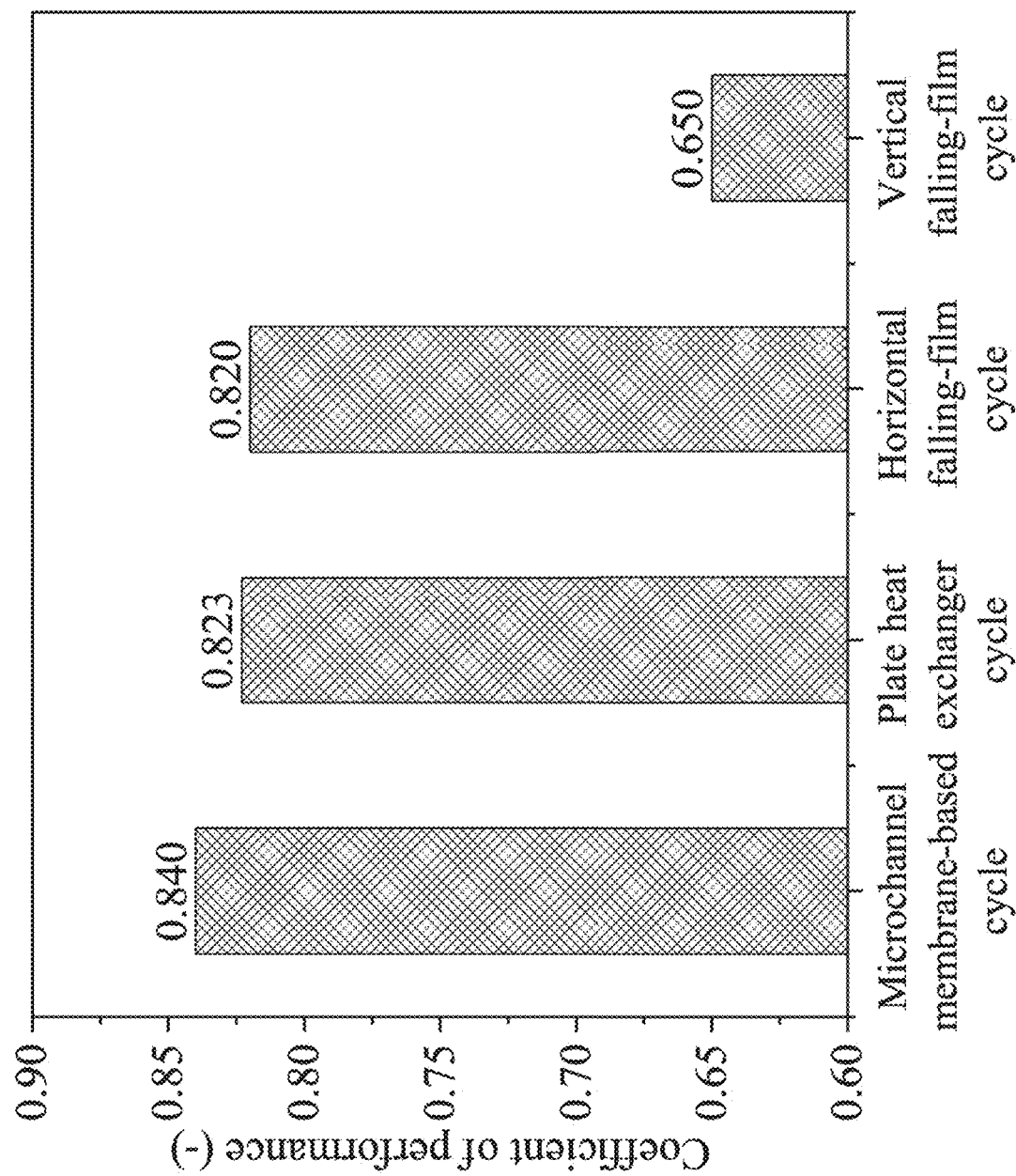
FIG. 14 depicts a comparison of efficiencies among different kinds of absorption heat pumps.

The microchannel membrane-based module is compared to other kinds of heat/mass exchangers, including a plate heat exchanger, a horizontal falling-film heat exchanger, and a vertical falling-film heat exchanger. FIG. 13 compares the volumetric cooling capacity, while FIG. 14 compares the coefficient of performance of different absorption heat pump cycles. It is determined that the microchannel membrane-based absorption heat pump can outperform existing absorption heat pumps with enhanced compactness, higher efficiency, and lower driving temperature.

The foregoing description of the present invention has been provided for the purposes of illustration and description. It is not intended to be exhaustive or to limit the invention to the precise forms disclosed. Many modifications and variations will be apparent to the practitioner skilled in the art.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A heat pump comprising:
   a first membrane-based absorber/evaporator module including:
   a first solution channel;
   a first refrigerant channel;

a first vapor channel positioned between the first solution channel and the first refrigerant channel;
a first liquid channel comprising a plurality of first liquid sub-channels which are arranged along a horizontal direction;
a second liquid channel comprising a plurality of second liquid sub-channels which are arranged along the horizontal direction;
a first porous membrane positioned between the first refrigerant channel and the first vapor channel; and
a second porous membrane positioned between the first vapor channel and the first solution channel; the first and second porous membranes permitting flow of vapor molecules therethrough while restricting flow of absorbent molecules;
a first hollow support plate connecting to and abutting against the first porous membrane;
a second hollow support plate connecting to and abutting against the second porous membrane, wherein the first hollow support plate and the second hollow support plate are located between the first porous membranes and second porous membranes;
a first vertical wall extending from the first refrigerant channel to the first solution channel with passing by the first porous membrane, the first hollow support plate, the first vapor channel, the second hollow support plate, and the second porous membrane in sequence; and
a second vertical wall extending from the first refrigerant channel to the first solution channel with passing by the first porous membrane, the first hollow support plate, the first vapor channel, the second hollow support plate, and the second porous membrane in sequence, wherein the first hollow support plate and the second hollow support plate are located between the first vertical wall and the second vertical wall, wherein each of the first and second vertical walls border an outermost first liquid sub-channel as well as an outermost second liquid sub-channel, and wherein the first vapor channel is defined and bordered by the first and second hollow support plates and the first and second vertical walls collectively by connecting opposite end surfaces of the first and second hollow support plates to the first and second vertical walls, and surfaces of the first and second hollow support plates face each other and are entirely exposed by the first vapor channel;
a second membrane-based generator/condenser module including:
a second solution channel;
a second refrigerant channel;
a second vapor channel positioned between the second solution channel and the second refrigerant channel;
a third liquid channel comprising a plurality of third liquid sub-channels which are arranged along the horizontal direction;
a fourth liquid channel comprising a plurality of fourth liquid sub-channels which are arranged along the horizontal direction;
a third porous membrane positioned between the second refrigerant channel and the second vapor channel; and
a fourth porous membrane positioned between the second vapor channel and the second solution channel; the third and fourth porous membranes permitting flow of vapor molecules therethrough while restricting flow of absorbent molecules;
a third hollow support plate connecting to and abutting against the third porous membrane;
a fourth hollow support plate connecting to and abutting against the fourth porous membrane, wherein the third hollow support plate and the fourth hollow support plate are located between the third porous membranes and fourth porous membranes;
a third vertical wall extending from the second refrigerant channel to the second solution channel with passing by the third porous membrane, the second hollow support plate, the second vapor channel, the fourth hollow support plate, and the fourth porous membrane in sequence; and
a fourth vertical wall extending from the second refrigerant channel to the second solution channel with passing by the third porous membrane, the second hollow support plate, the second vapor channel, the fourth hollow support plate, and the fourth porous membrane in sequence, wherein the third hollow support plate and the fourth hollow support plate are located between the third vertical wall and the fourth vertical wall, wherein each of the third and fourth vertical walls border an outermost third liquid sub-channel as well an outermost fourth liquid sub-channel, and wherein the second vapor channel is defined and bordered by the third and fourth hollow support plates and the third and fourth vertical walls collectively by connecting opposite end surfaces of the third and fourth hollow support plates to the third and fourth vertical walls, and surfaces of the third and fourth hollow support plates face each other and are entirely exposed by the second vapor channel; and
fluid communication paths between the first membrane-based absorber/evaporator module and the second membrane-based generator/condenser module.

2. The heat pump of claim 1, further comprising a solution pump.

3. The heat pump of claim 1, further comprising a heat exchanger positioned between and in fluid communication with the first membrane-based absorber/evaporator module and the second membrane-based generator/condenser module.

4. The heat pump of claim 1, wherein the first and third liquid channels are respectively positioned adjacent to the first and second refrigerant channels and the second and fourth liquid channels are respectively positioned adjacent to the first and second solution channels.

5. The heat pump of claim 1, wherein the porous membrane is selected from one or more of polyethylene (PE), polypropylene (PP), polytetrafluoroethylene (PTFE), polyvinylidene fluoride (PVDF), or their composites.

6. The heat pump of claim 1, wherein at least one of the first solution channel and the second solution channel has an absorbent-containing solution flowing therethrough, and the absorbent-containing solution includes one or more of a salt, an ionic liquid, water, LiBr, LiCl, $LiNO_3$ or $NH_3$.

7. The heat pump of claim 1, further comprising at least one refrigerant which flows through at least one of the first refrigerant channel and the second refrigerant channel and includes one or more of hydrofluorocarbon, hydrofluroolefin, or $CO_2$.

8. The heat pump of claim 1, wherein the first refrigerant channel comprises a plurality of first refrigerant sub-channels which are arranged along the horizontal direction, wherein the first solution channel comprises a plurality of first solution sub-channels which are arranged along the horizontal direction, wherein the second refrigerant channel comprises a plurality of second refrigerant sub-channels which are arranged along the horizontal direction, wherein the second solution channel comprises a plurality of second solution sub-channels which are arranged along the horizontal direction.

9. The heat pump of claim 8, wherein the first refrigerant channel and the first liquid channel share the same horizontal wall, and wherein the first solution channel and the second liquid channel share the same horizontal wall.

10. The heat pump of claim 1, wherein the first vertical wall and the second vertical wall have surfaces facing each other and entirely exposed from the first vapor channel, and the third vertical wall and the fourth vertical wall have surfaces facing each other and entirely exposed from the second vapor channel.

11. The heat pump of claim 1, wherein the surfaces of the first hollow support plates, the second hollow support plate, the first vertical wall, and the second vertical wall surrounding the first vapor channel collectively form a closed boundary for the first vapor channel, and wherein the surfaces of the third hollow support plates, the fourth hollow support plate, the third vertical wall, and the fourth vertical wall surrounding the second vapor channel collectively form a closed boundary for the second vapor channel.

* * * * *